INVENTOR.
GERD LESTON 3,390,198
TERTIARY-BUTYL-5-METHYL CATECHOL AS POLYMERIZATION INHIBITOR FOR HOT STYRENE
Gerd Leston, Pittsburgh, Pa., assignor to Koppers Company, Inc., a corporation of Delaware
Filed Dec. 16, 1965, Ser. No. 514,269
8 Claims. (Cl. 260—666.5)

ABSTRACT OF THE DISCLOSURE

Of several mono- and di-alkyl catechols tested (at 0.1%) as inhibitor for hot (63° C.) styrene, the best was 3-t- butyl -5- methyl catechol, showing negligible polymer through 74 days.

---

This invention relates generally to the stabilization of polymerizable vinyl monomers and more specifically to a compound for the inhibition of free-radical initiated polymerization of vinyl compounds at high temperatures.

A number of compounds, for example, t-butylcatechol, will prevent premature polymerization of vinyl monomers when the monomers are stored at or near ambient temperatures. However, when the monomers are subjected to extremely high temperatures, such as, during the final separation of pure monomer by a distillation, a different inhibitor must be added to the distillation pot to prevent the monomer from polymerizing in the pot before it can be distilled, and an inhibitor must also be added to the hot distillate to prevent the distillate monomer from polymerizing before it can be cooled to ambient temperatures. Compounds such as t-butylcatechol can be added to the distillate as they will inhibit polymerization of the distillate at high temperatures for the short period of time required to cool the distillate to room temperature, but they will not prevent the polymerization of the hot monomer over long periods of time. For this reason, compounds such as sulfur must be added to the distillation pot as polymerization inhibitors. The use of sulfur is undesirable since some of the sulfur is invariably carried over with the distillate and sulfur is difficult to remove from the monomer and imparts to the monomer a disagreeable odor and color as well as creating difficulties when it is desired to polymerize the monomer.

Surprisingly, we have found that 3-t-butyl-5-methylcatechol will inhibit the polymerization of vinyl monomers over extended periods of time at high temperatures and is vastly superior in this respect to other alkyl substituted catechols such as t-butylcatechol. In accordance with this invention the polymerization of vinyl monomers which are subjected to high temperatures (i.e., in excess of about 55° C.) for extended periods of time is inhibited by adding to said monomer a small amount of 3-t-butyl-5-methylcatechol.

Figure 1:
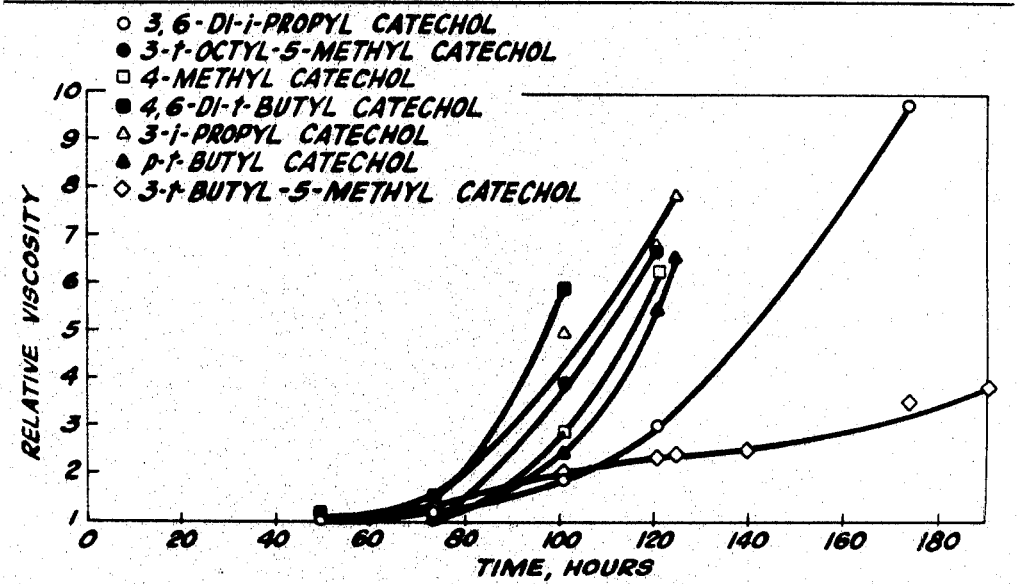

FIG. 1 is a graph showing the induction period of styrene that contains 10,000 parts of various catechol derivatives per million parts of styrene when heated to the temperature of 100° C.

Figure 2:
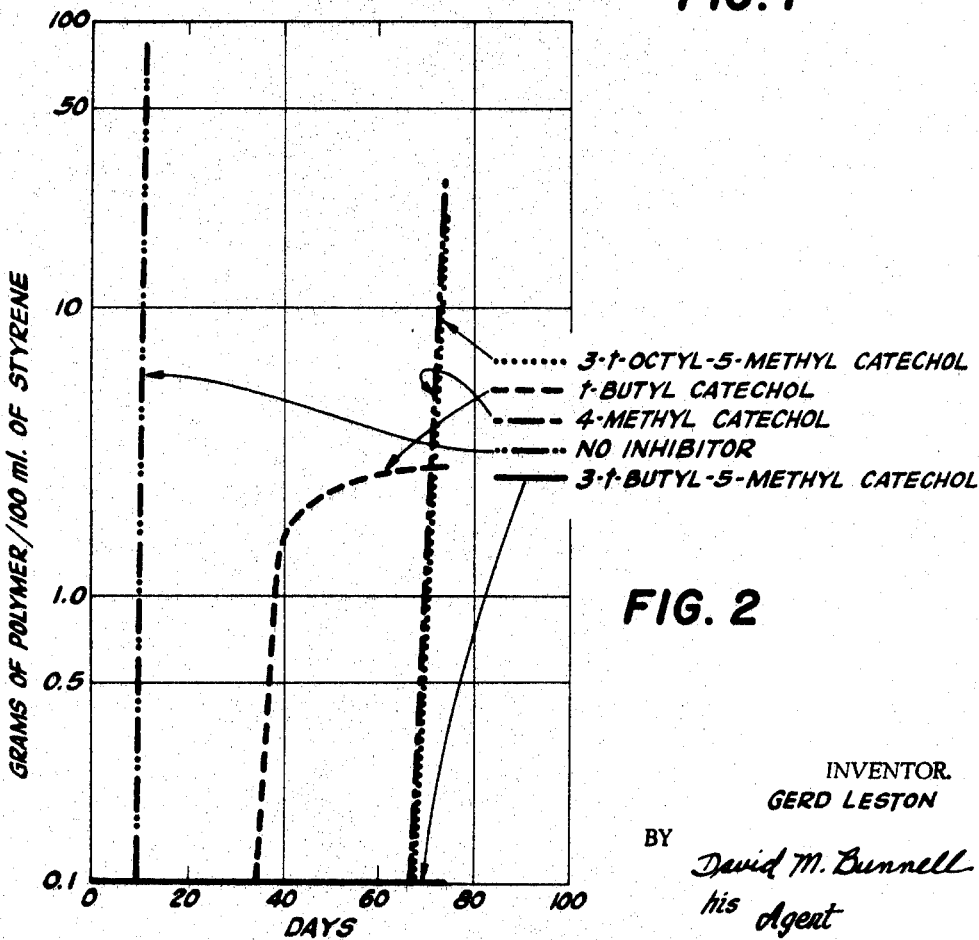

FIG. 2 is a graph showing the grams of polymer formed in aliquots of styrene containing 1,000 parts per million of various catechol derivatives when the aliquots were allowed to stand at room temperature for 9 days and then heated at 63° C. for an additional 66 days.

The invention is further illustrated but is not intended to be limited to the following examples wherein parts are parts by weight.

EXAMPLE I

Styrene was purified by washing with 5 percent aqueous sodium hydroxide and water until the washings were neutral to litmus and then was dried over anhydrous calcium sulfate. The drying agent was removed by filtration. Immediately thereafter the styrene was separated into seven aliquots. To one aliquot was added 10,000 parts by weight of 3-t-butyl-5-methyl catechol per million parts by weight of styrene; to another was added 10,000 parts by weight of 3,6-di-iso-propyl catechol per million parts by weight of styrene; to another was added 10,000 parts by weight of 3-t-octyl-5-methyl catechol per million parts by weight of styrene; to another was added 10,000 parts by weight of 4-methyl catechol per million parts by weight of styrene; to another was added 10,000 parts by weight of 4,6-di-t-butyl catechol per million parts by weight of styrene; to another was added 10,000 parts by weight of 3-iso-propyl catechol per million parts by weight of styrene and to the seventh portion was added 10,000 parts by weight of p-t-butyl catechol per million parts by weight of styrene.

The aliquots were placed in modified Foord viscometer tubes (Foord, J. Chem. Soc., 1940, 48–56; Lang, J. Chem. Eng. Data 5, 53–56, 1960) and the tubes were heated at 100° C. in a constant temperature bath. Briefly the Foord viscometer tubes contain a graduated cylinder and a capillary. The length of time for a given volume of liquid to pass through the capillary is determined. The relative viscosity ($\eta_r$) is then calculated on the basis that pure styrene monomer has a relative viscosity of 1.0. The degree of polymerization is related to the relative viscosity by the formula $\log \eta_r = kC$ where C is the concentration of polymer and $k$ is a constant for each monomer. $k$ is determined by conducting a methanol insolubles test as is described by Example III at a given value of $\log \eta_r$ preferably at $\log \eta_r = 1.8$.

The relative viscosity ($\eta_r$) was determined at the time intervals shown in Table I and the relatively viscosity ($\eta_r$) versus polymerization time curve was obtained in the manner described in the above literature references and plotted in FIG. 1.

The periodic testing of any aliquot was discontinued when the aliquot had reached a point where the amount of polymer therein had become prohibitive from an economic standpoint (above about 4) with regard to the loss of monomer. After 185 hours, the viscosity of the aliquot containing 3-t-butyl-5-methyl catechol had increased to a relative viscosity of only about 4 whereas all of the other aliquots had polymerized to a prohibitive degree in about two-thirds of this time. For example, t-butyl catechol failed to prevent the rapid polymerization of the styrene monomer after only about 120 hours. While the aliquot containing the 3,6-di-isopropyl catechol showed a somewhat slower rate of polymerization, it reached a relative viscosity of about 9.8 after only 170 hours and actually, from a practical standpoint of loss of monomer due to polymerization, the degree of polymerization of the aliquot containing 3,6-di-isopropyl catechol became prohibitive after only about 130 hours at 100° C.

TABLE I

| Hours | 3-6-di-i-propyl catechol | | 3-t-octyl-5-methyl catechol | | 4-methyl catechol | | 4,6-di-t-butyl catechol | | 3-i-propyl catechol | | P-t-butyl catechol | | 3-t-butyl-5-methyl catechol | |
|---|---|---|---|---|---|---|---|---|---|---|---|---|---|---|
| | Flow | η rel. | Flow | η rel. | Flow | η rel. | Flow | η rel. | Flow | η rel. | Flow | η rel. | Flow | η rel. |
| 49.5 | 3.6 | (1.00) | 3.4 | (1.00) | 3.6 | (1.00) | 4.4 | 1.16 | (3.9) | 1.00 | 3.2 | (1.00) | 3.6 | (1.00) |
| 73.8 | 4.3 | 1.13 | 3.6 | (1.00) | 3.9 | 1.05 | 5.8 | 1.50 | 5.8 | 1.50 | 3.6 | (1.00) | 4.5 | 1.25 |
| 101.0 | 7.1 | 1.87 | 13.8 | 3.94 | 10.5 | 2.84 | 23.5 | 5.97 | 19.43 | 4.94 | 8.5 | 2.43 | 7.3 | 2.03 |
| 120.6 | 10.8 | 3.00 | 26.4 | 6.71 | 22.2 | 6.28 | | | 26.4 | 6.71 | 19.0 | 5.43 | 8.4 | 2.33 |
| 124.1 | | | | | | | | | 31.0 | 7.88 | 23.0 | 6.57 | 8.8 | 2.44 |
| 139.5 | | | | | | | | | | | | | 9.0 | 2.50 |
| 173.8 | 37.2 | 9.79 | | | | | | | | | | | 12.8 | 3.56 |
| 185.2 | | | | | | | | | | | | | 14.0 | 3.89 |

EXAMPLE II

Four hundred parts of 3-t-butyl-5-methyl catechol were added to 1,000,000 parts by weight of the monomer ethyl alpha-(hydroxymethyl)-acrylate and the composition was placed in a Pyrex tube (8 millimeter diameter by 37 centimeters long). The tube was sealed leaving an air bubble about 3 centimeters long above the liquid level. The tube was placed in a constant temperature bath at 55° C. for 33 days. At the end of this time, the viscosity of the composition was measured and essentially no change in the relative viscosity of the composition had occurred.

EXAMPLE III

Styrene was washed with 4 portions of 5% aqueous sodium hydroxide and then washed with water until the washings were neutral to litmus. The styrene was dried over anhydrous calcium sulfate and the drying agent was removed by filtration. The styrene was separated into 100 milliliter aliquots. A different catechol derivative was added to each aliquot. Thus, the various catechols listed in Table II were added to the 100 milliliter portions of styrene to give 1,000 p.p.m. (0.1%) by weight concentrations, of catechol in styrene. The portions were stored in volumetric flasks at room temperature for 9 days. Thereafter the temperature was raised to 63° C. Periodically, the portions were tested to determine the amount of polymer by removing 10 milliliter quantities of each composition. Each quantity was added to 100 milliliters of methanol to precipitate the polymer, and each mixture was filtered through a tared sintered glass crucible. The insoluble polymeric material remaining on the dried filter was determined and the amount of polymer formed in the monomer calculated and plotted in FIG. 2. The sample of styrene containing the 3-t-butyl-5-methyl catechol inhibitor showed essentially no polymer after 75 days. The samples containing the other catechol inhibitors contained from 3–30 percent by weight of polymer after 70 days.

TABLE II

| Inhibitor Added— | Time (Days) | Grams Polymer/ 100 ml. styrene |
|---|---|---|
| None | 0 | 0.10 |
| | 5 | 0.09 |
| | 9 | 0.07 |
| | 12 | (1) |
| 3-t-octyl-5-methyl catechol | 12 | 0.07 |
| | 19 | 0.06 |
| | 32 | 0.10 |
| | 54 | 0.09 |
| | 74 | 21.8 |
| t-butyl catechol | 12 | 0.08 |
| | 19 | 0.04 |
| | 32 | 0.07 |
| | 54 | 2.5 |
| | 74 | 2.8 |
| 4-methyl catechol | 12 | 0.05 |
| | 19 | 0.05 |
| | 32 | 0.06 |
| | 54 | 0.06 |
| | 74 | 29.0 |
| 3-t-butyl-5-methyl catechol | 12 | 0.06 |
| | 19 | 0.09 |
| | 32 | 0.10 |
| | 54 | 0.08 |
| | 74 | 0.08 |

1 Polymerized.

EXAMPLE IV

Divinyl benzene compositions were prepared which contained respectively 1.5% 3-t-butyl-5-methyl catechol and 1.5% of tertiary-butyl catechol. The compositions were sealed in modified Foord viscometer tubes and heated at 100° C. at a constant temperature bath. After 100 hours, the divinyl benzene composition containing t-butyl catechol had a relative viscosity of 10. The composition containing 3-t-butyl-5-methyl catechol had a relative viscosity of 1.7.

By the term "vinyl monomer" is meant various aliphatic and aromatic monomers conventionally employed to produce high polymers, for example, vinyl chloride, butadiene, methylmethacrylate, ethyl alpha-(hydroxymethyl) acrylate, acrylonitrile, styrene, divinyl benzene, alpha-methyl styrene, vinyl naphthalene, etc. The amounts of inhibitor to be employed will depend upon the tendency of the monomer to polymerize, the temperature to which the monomer is to be subject, and the length of time the monomer is subjected to these temperatures. Generally, amounts of inhibitor ranging from between 100–20,000 parts per million (0.01–2.0%) by weight of inhibitor are employed.

I claim:

1. A method of inhibiting the free radical polymerization of vinyl monomers which are subjected to high temperatures for extended periods of time comprising adding to said monomers 3-t-butyl-5-methyl catechol.

2. The method of claim 1 in which said monomer is styrene.

3. The method of claim 1 in which said 3-t-butyl-5-divinylbenzene.

4. The method of claim 1 in which said 3-t-butyl-5-methyl catechol is added in an amount of from about 100 to 20,000 parts per million by weight of vinyl monomer.

5. The method of claim 1 in which said monomers are subjected to temperatures in excess of 55° C.

6. A composition which is inhibited with respect to free radical polymerization comprising a vinyl monomer containing from about 100 to 20,000 parts per million by weight of vinyl monomer of 3-t-butyl-5-methyl catechol.

7. The composition of claim 6 in which said monomer is styrene.

8. The composition of claim 6 in which said monomer is divinyl benzene.

References Cited

Eugen Mueller et al. "New Pyrocatechols Z. Naburforsch, 18b(12) 1002–9 (1963).

DELBERT E. GANTZ, *Primary Examiner.*

G. E. SCHMITKONS, *Assistant Examiner.*

UNITED STATES PATENT OFFICE
CERTIFICATE OF CORRECTION

Patent No. 3,390,198 June 25, 1968

Gerd Leston

It is certified that error appears in the above identified patent and that said Letters Patent are hereby corrected as shown below:

Column 4, line 45, "The method of claim 1 in which said 3-t-butyl-5-divinylbenzene." should read -- The method of claim 1 in which said monomer is divinylbenzene. --.

Signed and sealed this 6th day of January 1970.

(SEAL)
Attest:

Edward M. Fletcher, Jr.
Attesting Officer

WILLIAM E. SCHUYLER, JR.
Commissioner of Patents